United States Patent [19]

Loiterman et al.

[11] Patent Number: 4,776,706
[45] Date of Patent: Oct. 11, 1988

[54] UNIVERSAL CONNECTOR AND COMPENSATING TERMINAL APPARATUS FOR TEMPERATURE RESPONSIVE INSTRUMENTS

[75] Inventors: Robert Loiterman, Washington Township, Washington County; Randolph Klein, Wayne, both of N.J.

[73] Assignee: Thermo Electric Instruments, Saddle Brook, N.J.

[21] Appl. No.: 83,205

[22] Filed: Aug. 10, 1987

[51] Int. Cl.⁴ .................... G01K 7/10; H01L 35/10
[52] U.S. Cl. ................................ 374/208; 136/235; 374/181; 439/620
[58] Field of Search .................. 374/181, 182, 183, 1; 53/431; 136/235

[56] References Cited

U.S. PATENT DOCUMENTS

| | | | |
|---|---|---|---|
| 2,410,098 | 10/1946 | Muller | 136/235 X |
| 4,165,995 | 8/1979 | Kolb | 136/235 X |
| 4,482,261 | 11/1984 | Dewey et al. | 374/181 |
| 4,488,824 | 12/1984 | Salem | 374/178 |
| 4,537,516 | 8/1985 | Epstein | 374/181 |
| 4,623,266 | 11/1986 | Kielb | 374/181 |

Primary Examiner—Daniel M. Yasich
Attorney, Agent, or Firm—Arthur L. Plevy

[57] ABSTRACT

A connector and compensating terminal apparatus for use with temperature responsive instruments is adapted to accommodate sensing devices such as thermocouples and RTDs having a wide plurality of lead connectors. The apparatus includes a temperature compensating block assembly having first and second conductive blocks coupled together at opposing surfaces by means of a thermally conductive and electrically insulative material, a corresponding surface of each block is adapted to receive one lead of a thermocouple sensor or RTD which lead is held in contact on the surface of the block by a holding block having a corrugated holding surface and which holding block is movably mounted with respect to the conductive block to provide a variable spacing to enable the apparatus to accommodate the different types of thermocouple or RTD lead connectors. Additionally, there are two outside conducting blocks for two of the 3 or 4 RTD leads which leads are also held in place by the respective holding blocks.

16 Claims, 2 Drawing Sheets

UNIVERSAL CONNECTOR AND COMPENSATING TERMINAL APPARATUS FOR TEMPERATURE RESPONSIVE INSTRUMENTS

BACKGROUND OF THE INVENTION

This invention relates to temperature responsive measuring devices and more particularly to a universal connector and compensating terminal arrangement to be utilized in a temperature responsive instrument.

Presently, there are many instruments which are available which operate essentially as a temperature indicator or calibration instrument. As such, these instruments are capable of interfacing or receiving a thermocouple assembly or a resistance temperature device (RTD). Based on coupling to such devices, the instrument is capable of providing temperature calibration and/or temperature indication. The use of the thermocouple or RTD device with the instrument enables one to monitor temperatures in different environments. Such devices, as indicated, are available from many sources including the assignee herein.

Essentially, the instrument enables one to perform temperature measurements. These devices utilize curves which are indicative of thermocouples or RTDs to measure or simulate a temperature.

As such, the devices are referred to an temperature indicators/calibrators, and an example of such a device is the one sold by the assignee herein under the trademark MICROMITE II and available from Thermo Electric Instruments of Saddle Brook, N.J. 07662.

As indicated, these devices may be hand-held or may constitute a larger device. In any event, the devices have suitable plugs for accommodating various thermocouple devices as well as RTD devices. As one can ascertain, thermocouples and RTDs are available in many different configurations. As such, each different thermocouple or RTD device may have a completely different connector arrangement. The connector arrangements to thermocouple devices may also differ from those connectors which are utilized on RTD devices. Hence, such a unit preferably should employ a connector arrangement which can accept virtually any kind of input lead normally used on various types of thermocouples, as for example ordinary wire, standard and miniature thermocouple connectors, banana plugs, as well as three- or four-wire RTD's.

As is known, a thermocouple is a device which generates a voltage proportional to the difference in temperature between the hot and cold junction (reference junction). Such thermocouples generate such a voltage as a function of the metals or alloys incorporated therein. In any event, as indicated above, many different examples of thermocouples exist in the prior art. These thermocouples as indicated may be terminated in completely different connectors and can be utilized for example with a suitable temperature measuring instrument as the type described above if the instrument is capable of accommodating various connectors. As such, thermocouples which are available from many commercial sources including the assignee herein are terminated with mini plugs, regular size plugs, probes or essentially wire down to 12 gage.

Such an instrument should be capable of accommodating all the different types of thermocouple plugs in order to utilize the instrument efficiently. As is known, RTD configurations may come in three- or four-wire configurations and can also be terminated in a wide variety of plugs, and hence such devices must also be compatible with such an instrument. In the operation of thermocouples, the reference junction temperature of the thermocouple is normally monitored in order to obtain some reference temperature. This reference temperature can be room temperature or some other suitable temperature.

The problem involved with thermocouple measurement is that both the positive and the negative leads of the reference junction of the thermocouple must be maintained at equal temperatures, and that this temperature must be accurately measured by the thermocouple instrument. It is also important that the positive and negative terminals of the thermocouple instrument, which is also the thermocouple reference junction, be made of the same material and have similar impurities. This will remove any contact potential which may exist due to the coupling of the different thermocouples materials to the terminal assembly. The mass of the material of the terminal assembly needs to be large. This will create a large thermal inertia and will equalize the thermal response rate of the thermocouple reference junction and the reference junction temperature sensor which in this invention is a band-gap voltage reference imbedded in the negative terminal of the terminal assembly.

Once the potential difference is measured between the positive and negative wires of the reference junction of the thermocouple, and the temperature of the reference junction is accurately measured, the temperature of the hot junction can be calculated. This method of measurement is called reference junction compensation.

The prior art is cognizant of this problem and the problem has been explained for example in prior art references as well as various solutions to the same. See for example U.S. Pat. No. 4,488,824 entitled METHOD AND APPARATUS FOR PRECISION TEMPERATURE MEASUREMENT issued on Dec. 18, 1984 to R. J. Salem. This patent describes a band-gap voltage-reference and temperature sensor which is used to determine the temperature of the cold junction of a thermocouple for algebraic combination with the thermocouple signal to provide a precision temperature measurement at relatively fast speed. Thus, as can be ascertained from this particular reference, there is employed copper slugs which function as thermal inertia elements to equalize the thermal response rates of the temperature sensor and thermocouple.

The purpose of the device described is to equalize the thermal response at the cold junction and the band-gap device to temperature changes. The device utilizes a copper body which is stacked above another copper slug. The bodies are separated from each other by a thin layer of a quantity of a thermal conductive but electrically insulating material such as silicon grease.

Other patents such as U.S. Pat. No. 4,623,266 entitled COLD JUNCTION COMPENSATION FOR THERMOCOUPLE issued on Nov. 18, 1986 to J. A. Kielb. This patent describes a cold junction compensation bridge for a thermocouple circuit which includes a temperature compensation resistor encased in heat conducting material. This is directly connected to the same terminal block or strip to which the thermocouple leads are attached. In this particular patent the cold junction compensation resistor is in the same location as the junctions of the thermocouple to insure that any changes in temperature of the cold junction are sensed by the resistor.

As one can see from the above-noted references and others which exist in the prior art, there must be compensation of the cold junction and one must be sure that the temperature of both junctions are not affected by ambient temperature or not affected by any contact potential which may exist due to the coupling of the various thermocouple leads to the connector assembly. As indicated, these problems are known in the art as evidenced by the above-noted patents. Apart from this consideration which is a relatively major problem in regard to coupling or connecting thermocouples to various devices, is the problem of accommodating a large variety and assortment of different connector techniques which may be associated with thermocouple devices.

It is therefore an object of the present invention to provide an improved connector and compensating block arrangement which is employed with a large number of various thermocouple devices to enable one to connect an instrument to such devices in an easy and reliable manner while further providing ambient temperature compensation for the reference junction as desired.

BRIEF DESCRIPTION OF THE PREFERRED EMBODIMENT

A connector and compensating terminal apparatus for use with temperature responsive instruments of the type adapted to accommodate a thermocouple or RTD and having first and second apertures on a surface of said instrument for receiving first and second thermocouple or RTD leads, comprising a temperature compensating block assembly comprising first and second conductive blocks coupled together at respective surfaces by means of a thermally conductive and electrically insulative material, with said first block associated with said first aperture and said second block associated with said second aperture to allow said first thermocouple lead when inserted into said first aperture to contact a given surface of said first block and to allow said second thermocouple lead when inserted into said second aperture to contact the corresponding surface of said second block first and second movable holding blocks positioned respectively with respect to said given surfaces of said blocks to enable said holding blocks when moved to push said thermocouple leads into firm contact with said conductive block surfaces relatively independent of the type of said thermocouple leads.

DETAILED DESCRIPTION OF THE FIGURES

Figure 1:
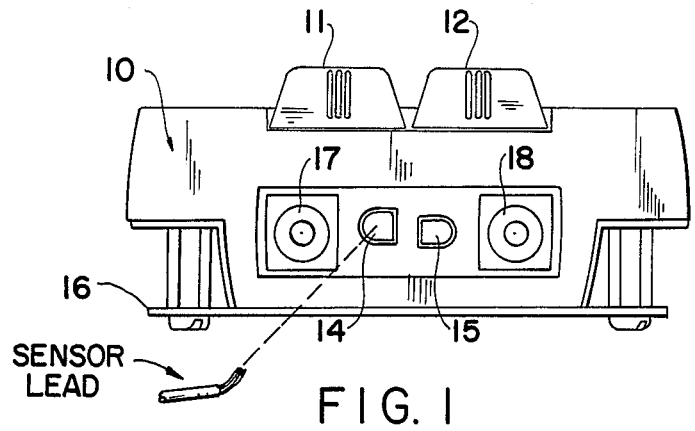
FIG. 1 is a front plan view of a typical temperature measuring instrument adapted to accommodate various thermocouple devices according to this invention.

Referring to FIG. 1, there is shown an instrument housing 10 which includes adequate circuitry to perform temperature measurements as to perform tracking and indications of temperature. The instrument for example as shown in FIG. 1, is the type of instrument sold by Thermo Electric Instruments of Saddle Brook, N.J., the assignee herein under the trademark MICROMITE II. This instrument is referred to as a temperature indicator/calibrator, and the purpose of the instrument is to perform temperature measurements and temperature simulation for calibration of various devices. The operation of the instrument is not deemed to be pertinent to this disclosure or specification which essentially relates to a connector mechanism as well as a compensating block as will be further described.

It is, of course, understood that the connector arrangement as well as the compensating block have applicability in general to other devices which accommodate thermocouples or RTDs as will be evident to those skilled in the art.

As seen in FIG. 1, there are two rotatable knobs designated as 11 and 12. One knob 11 is associated with the negative terminal of a thermocouple while the other knob 12 is associated with the positive terminal. As will be explained, associated with the two knobs 11 and 12 are two input apertures 14 and 15. The apertures 14 and 15 are dimensioned to accommodate a wide variety of different size connector assemblies which are associated with the two-wire thermocouple device. As such, the openings 14 and 15 can accommodate mini T/C plugs, standard T/C plugs, probes or wire associated with the specific thermocouple type. Wire can be accommodated down to 12 gage. There are also two apertures or openings designated as 17 and 18 to accommodate connectors associated with the leads of RTD devices. Essentially, the housing 10 contains suitable circuitry to process the thermocouple voltages or RTD resistances in order to maintain an indication of temperature or output voltages or equivalent resistances in order to simulate thermocouples or RTDs.

Associated with such an instrument is a printed circuit board 16 which holds various amplifiers and other devices designated as analog devices which interface with the output leads from the thermocouple or RTD device in order to achieve temperature measurement or calibration.

Figure 2:
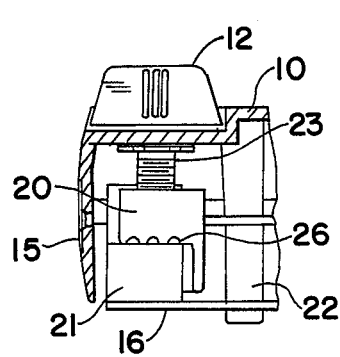
FIG. 2 is a partial side view of a connector and compensating block assembly according to this invention.

Referring to FIG. 2, there is shown a cross-sectional view taken through the housing in order to fully understand the nature of the connector and compensating block assembly.

Figure 3:
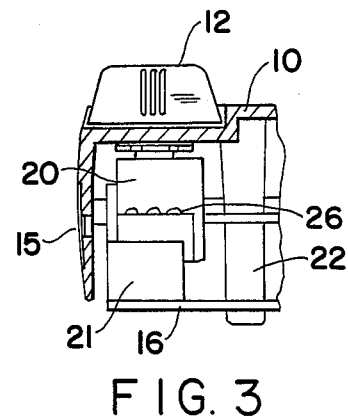
FIG. 3 is a side view as shown in FIG. 2 showing the connector assembly in a raised position.

As seen from FIG. 2, the knob 12 is rotatable and is coupled to a rotatable threaded bolt assembly 23 which essentially is coupled to a holding block 20. This rotatable threaded bolt assembly 23 enables the holding block 20 and its companion block 50 (FIG. 5) which is connected to a duplicate rotatable threaded bolt assembly to move upwardly and downwardly as the knobs are rotated. The holding block 20 as seen in FIG. 3 can be moved upwardly and downwardly with respect to the compensator block 21. The compensator block 21 is fabricated from a highly conductive metal material such as gold-plated copper. The holding block 20 is fabricated from an insulating material such as a glass-filled polycarbonate material such as that sold under the trademark of LEXAN. Other insulator materials for the holding block 20 can also be employed. Essentially, as one can see from FIG. 2, one input aperture as aperture 15 is positioned so that when the holding block is in the full raised position as shown in FIG. 3, one can then insert various diameter size connectors associated with a thermocouple or RTD into the aperture 15. The connector is then positioned between the holding block 20 and the compensating block 21. Upon rotation of the knob in the opposite direction, the holding block is moved to the position shown in FIG. 2 and firmly grasps the connector as inserted into aperture 15. The holding block as for example shown in both FIGS. 2 and 3 has a corrugated bottom surface which operates to firmly grab the top surface of an inserted thermocouple connector and to firmly couple that connector to the conductive compensating block 21 as will be further explained.

Figure 4:
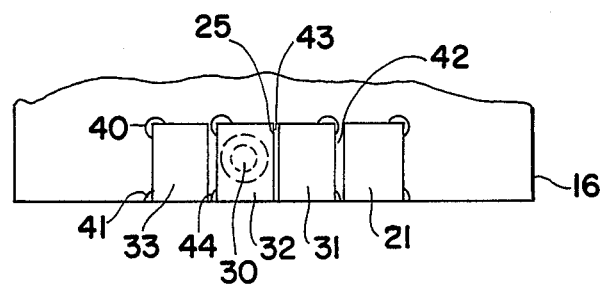
FIG. 4 is a top plan view showing a compensating block arrangement according to this invention.

Referring to FIG. 4, there is shown a top plan view of a compensator block assembly. The compensator block assembly is secured and electrically connected to the analog printed circuit board by means of solder joints as 40 and 41 which secures all of the copper blocks to suitable terminal areas on the printed cicuit board 16. As can be seen, there is a first RTD block 21 which again is fabricated from gold-plated copper and which essentially is positioned to interface with aperture 18 of FIG. 1 and used for the fourth wire in four wire RTDs. The block 21 is spaced by means of a predetermined gap 42 from a RTD/thermocouple compensator block 31. The block 31 is thermally coupled to a second RTD/thermocouple block 32 by means of a junction 43. The junction 43 includes a thin layer of Beryllia which is silver soldered to block 31 on one surface and silver soldered to block 32 on the other surface. Beryllia is an excellent thermal conductivity material with extremely poor electrical conductivity. In this manner the positive and negative terminals of the thermocouple which are inserted respectively into apertures 14 and 15 are maintained at the same temperature due to the fact that the Beryllia layer 43 exhibits excellent thermal coupling but poor electrical coupling. As indicated, the Beryllia layer is silver soldered to the respective blocks by means of a silver solder connection 25.

Associated with block 32 is a precision temperature sensing device 30 (made by National Semiconductor, Part No. LM335A). The temperature sensor operates to sense the temperature of blocks 31 and 32 in order to determine the ambient temperature of those blocks and thermocouple wire connected to it and to thereby enable the instrument to accurately compensate for the reference junction temperature.

Also shown in FIG. 4 is another RTD block 33 which is separated from block 32 by means of an air gap 44 relatively of the same spacing as between blocks 21 and 31. This block also is associated with aperture 17 of FIG. 1 and is used to accommodate three- or four-wire RTD's. As is known, a thermocouple device is a two-wire device and blocks 31 and 32 are associated with apertures 14 and 15 to accommodate various thermocouple devices. As one can ascertain, when a thermocouple device is inserted into apertures 14 and 15, the device contacts the gold-plated copper blocks 31 and 32 via its respective contacts. This electrical and thermal contact allows the voltage difference of the positive and negative wires of the thermocouple to be used by the circuitry and printed circuit board 16 in FIG. 1. The voltage is a function of temperature. This voltage has to be compensated for reference junctions and temperatures. The Beryllia layer 43 which is in good thermal contact with both blocks 31 and 32 assures that the temperature of both blocks is exactly the same due to the fact that the Beryllia layer is an excellent thermal conductor. This allows for excellent reference junction compensation.

Figure 5:
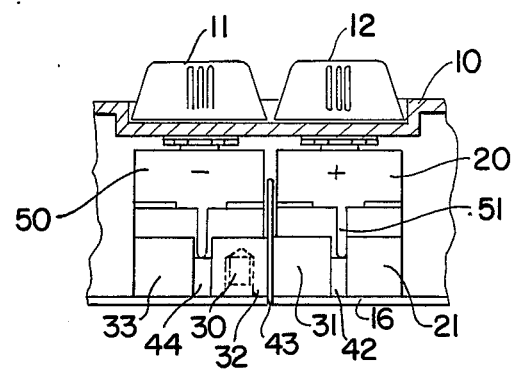
FIG. 5 is a partial front view showing a connector assembly associated with a compensating block assembly according to this invention.

Referring to FIG. 5, there is shown a complete detailed view of the holding blocks 20 and 50 which are each associated with the respective rotatable knobs 11 and 12 indicative of a negative and positive thermocouple terminal. Each holding block 20 and 50 has a central depending flange 51 which rides and is positioned within the gap 42 and 44 formed between the RTD block block 21 and the respective thermocouple block 31. As one can then ascertain from FIG. 5, as each of the knobs 11 and 12 are rotated, the associated holding blocks 50 and 20 move up and down. If a lead of varying size is inserted into a respective aperture as 17, 14, 15, or 18, the respective lead will be secured on the respective compensating block by means of the holding block as moved to the position for example as shown in FIG. 2. In this manner, any lead so inserted is firmly secured and makes excellent electrical and thermal contact with the associated compensating block by holding the lead in position by means of the holding blocks. As one can see from FIG. 5, the extending flange which rides in the respective channels 42 and 44 provides a barrier between blocks 33 and 30 and also blocks 21 and 31. This barrier prevents wires inserted in apertures 17 and 14 or apertures 15 and 18 from shorting to one another. Beryllia layer 43 extends in gap 45 and prevents wires inserted in apertures 14 and 15 from shorting to one another.

It is, of course, again emphasized that the blocks 32 and 31 are held in good thermal contact by means of the Beryllia layer 43 which therefore assures that the respective thermocouple junctions which are connected to blocks 31 and 32 are relatively at the same temperature while the Beryllia layer further assures that there is no electrical conductivity between the same.

Figure 6:
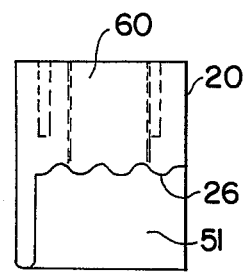
FIG. 6 is a side plan view of a typical holding block assembly utilized in this invention.
Figure 7:
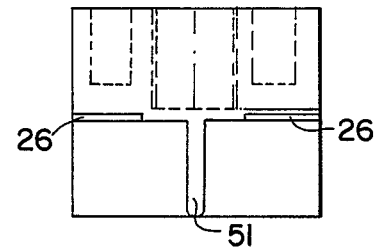
FIG. 7 is a front view of the holding block assembly.
Figure 8:
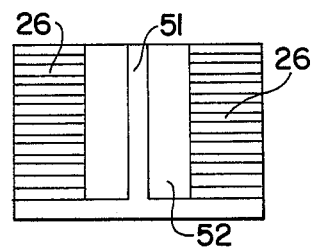
FIG. 8 is a top view of the holding block assembly.

Referring to FIGS. 6, 7 and 8, there is shown respectively a side view, a front view and a bottom view of a holding block assembly such as 21. As one can see, the corrugations as 26 are located on the respective bearing surfaces of the holding block 20 and are separated by a non-corrugated area 52 from the central depending flange 51. The flange 51 rides in the gap as 42 and 44 between the compensating block assemblies associated with the respective input apertures as 17, 18, 14 and 15. There is a central threaded area 60 which accommodates a bolt and enables the block to ride up and down thereby assuring a firm connection between the compensating block and the inserted thermocouple or RTD connector or wire.

Figure 9:
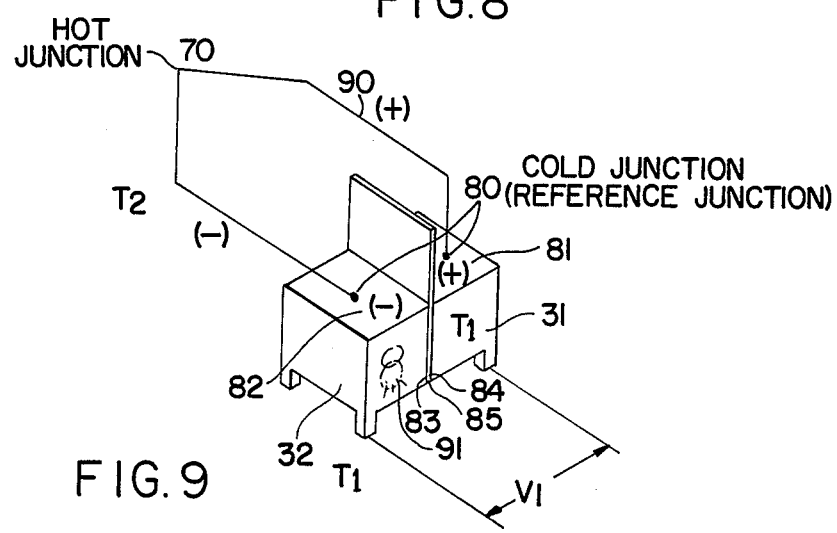
FIG. 9 is a simple diagrammatic view showing a thermocouple device coupled to a compensating block assembly according to this invention.

Referring to FIG. 9, there is shown a simple schematic of a thermocouple device 90 connected to the compensating blocks 31 and 32 via the respective terminals 81 and 82. As shown in FIG. 9, the Beryllia layer 85 is soldered to block 31 by means of a silver solder joint 84 and is respectively soldered to block 32 by means of the silver solder joint 83.

The voltage difference V1 that is generated between the positive 81 and the negative wires 82 of the thermocouple at the reference junction 80 is proportional to the difference in temperature between the hot junction 70 and the cold junction 80. This relationship is expressed by the following: V1=F(T2(Hot Junction)−T1(Cold Junction). This relationship is true only if the positive wire 81 and the negative wire 82 at the reference junction are held at the same exact temperature. This is accomplished by the Beryllia layer 85 which provides excellent thermal conductivity between blocks 31 and 32. It is important that blocks 31 and 32 be may of the same material and have similar impurities. This will cancel out any contact potential which may exist due to the coupling of the different thermocouple materials of wires 81 and 82 to the blocks 31 and 32 respectively. Gold is one the better materials to use for this purpose and as such blocks 31 and 32 are gold plated. It is also important that blocks 31 and 32 have sufficient mass to create a large thermal inertia. The large thermal inertia will equalize the thermal response rate of the thermocouple reference junction 80 and the precision temperature sensor 91 imbedded in block 32.

The precision temperature sensor 91 is used to measure the temperature of the reference junction 80. Once the temperature of the reference junction and voltage V1 is known, the temperature at the hot junction 70 can be calculated using the above stated relationship.

As one can also ascertain, the terminal leads 81 and 82 associated with the thermocouple 90 may be terminated in a wide variety of different connectors. These connectors have been indicated above.

Hence, when one desires to employ any one of a plurality of different thermocouples with the instrument 10, one would insert the respective thermocouples leads into apertures 14 and 15 and rotate the knobs until the corrugated surface firmly secures the thermocouple lead to the respective connector block. This assures excellent electrical connection in a simple and reliable manner.

Thus this new and unique connector arrangement accepts virtually any kind of input connector such as wire, standard and miniature thermocouple connectors, and banana plugs. In this manner, the entire instrument is intimately associated with universal connecting means while assuring that the positive and negative terminals of the thermocouple device are thermally compensated for by means of the associated connector blocks.

It is, therefore, apparent that the above-described apparatus has many advantages in accommodating a wide variety of thermocouples or RTD devices to be used with temperature measuring instrumentation and provides a rapid and reliable means of connecting or accommodating various thermocouple devices together with such instrumentation.

What is claimed is:

1. A connector and compensating terminal apparatus for use with temperature responsive instruments having a housing and circuitry therein and of the type adapted to accommodate a temperature responsive sensor such as a thermocouple or RTD and having first and second apertures on a surface of one of said instruments for receiving first and second sensor leads, comprising
    a temperature compensating block assembly comprising first and second conductive blocks coupled together at respective surfaces by means of a thermally conductive and electrically insulative material, with said first block aligned with said first aperture and said second block aligned with said second aperture to allow said first sensor lead when inserted into said first aperture to contact a given surface of said first block and to allow said second sensor lead when inserted into said second aperture to contact the corresponding surface of said second block,
    first and second movable holding blocks positioned respectively with respect to said given surfaces of said blocks to enable said holding blocks when moved to push said sensor leads into firm contact with said conductive block surfaces relatively independent of the type of said sensor leads.

2. The apparatus according to claim 1, wherein said first and second blocks are coupled together by means of a layer of Beryllia.

3. The apparatus according to claim 2, wherein said layer of Beryllia is silver soldered to respective surfaces of said conductive blocks to thermally connect and electrically insulate said blocks.

4. The apparatus according to claim 1, wherein each of said blocks is fabricated from gold-plated copper.

5. The apparatus according to claim 1, wherein said holding blocks are fabricated from an insulator material.

6. The apparatus according to claim 1, wherein each surface of said holding block as pushing said sensor leads is corrugated.

7. The apparatus according to claim 1, wherein each of said holding blocks has an extending flange which flange is adapted for insertion into a guide channel associated with each conductive block.

8. The apparatus according to claim 1, further including a precision temperature sensor coupled to one of said blocks for monitoring the temperature of said assembly.

9. A compensating and connector assembly apparatus for coupling a temperature responsive instrument having a housing and circuitry therein to a thermocouple or similar sensor assembly of the type having at least two leads indicative of a sensing and reference junction and for accommodating various sensor assemblies which leads may be terminated in different connector configurations, comprising:
    a temperature compensating block assembly comprising a first conductive block separated from a second conductive block by a first gap of a given width, said second conductive block coupled to a third conductive block by means of a thermally conductive and electrically insulated layer, with said third block separated from a fourth block by a second gap of said given width, with a top surface of said second and third coupled blocks adapted to respectively receive a first and second thermocouple lead, with said first lead positioned on said surface of said second block and said second lead positioned on the surface of said third block,
    first and second movable holding block assemblies positioned above said compensating block assembly and adapted to move into contact with said top surface of said conductive blocks, with said first holding block assembly having a depending flange positioned in said first gap between said first and second blocks and adapted to move along said gap with a surface of said holding block adjacent said gap operative to contact and hold said lead in firm contact with said conductive block surface, with said second holding block assembly having a depending flange positioned in said second gap between said third and fourth conductive blocks and adapted to move along said gap with a surface of said second holding block adjacent said gap operative to contact and hold said lead in firm contact with said conductive block surface.

10. The apparatus according to claim 9, wherein said surfaces of said holding blocks adjacent said flanges are corrugated.

11. The apparatus according to claim 9, wherein said layer coupling said second conductive block to said third conductive block is Beryllia.

12. The apparatus according to claim 9, further including rotatable means coupled to each of said holding blocks to allow said blocks to move within said respective gaps when said means are rotated.

13. The apparatus according to claim 9, wherein each of said conductive blocks are fabricated from copper.

14. The apparatus according to claim 9, wherein each of said holding blocks are fabricated from an insulator material.

15. The apparatus according to claim 11, wherein said layer is soldered at respective sides of said second and third blocks.

16. The apparatus according to claim 15, wherein said solder is a silver solder bond.

* * * * *